United States Patent Office 2,972,626
Patented Feb. 21, 1961

2,972,626

PURIFICATION OF ORGANO-SILICATE CONDENSATION PRODUCTS

Ralph Marotta, Olivette, Mo., assignor to Monsanto Chemical Company, St. Louis, Mo., a corporation of Delaware No Drawing. Filed Jan. 15, 1958, Ser. No. 708,976

10 Claims. (Cl. 260—448.8)

This invention relates to the purification of halogen contaminated organo-silicate condensation products.

Organo-silicate condensation products are a well-known and highly useful class of polymeric materials, which structurewise may be represented as follows:

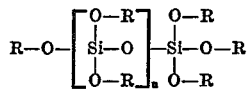

wherein the respective R's are like or unlike organic radicals (e.g., alkyl, cycloalkyl, aralkyl, aryl, alkaryl, or heterocyclic groups), and wherein $n$ is a whole number usually greater than one. These condensation products are generally obtained as the polymerized hydrolysis products of the esters of ortho silicic acid by controlled hydrolysis of the tetra orthosilicate esters with water. The tetra orthosilicate esters are prepared by several well-known methods. For example, by reacting silicon tetrachloride or silicon tetrabromide with a mono-hydroxy substituted organic compound (such as a compound of the structure ROH wherein R has the aforedescribed significance) or reacting silicon tetrafluoride with a mono-hydroxy substituted organic compound in the presence of ammonia or an organic amine. While in the ester formation when $SiCl_4$ and $SiBr_4$ are employed most of the hydrogen halide by-product (i.e., HCl or HBr) evolves during the esterification, the ester and the polymerized hydrolysis products obtained therefrom usually contain a small amount of residual free hydrogen halide. Additionally, the polymerized hydrolysis products obtained from a tetra orthosilicate ester prepared from $SiF_4$, $SiCl_4$ or $SiBr_4$ are generally characterized by halogen substituents which are highly susceptible to hydrolysis and when hydrolyzed provide hydrogen halide (e.g., HF, HCl, or HBr). Hydrogen halide as such and/or hydrolyzable halogen substituents are particularly objectionable in that they render the organo-silicate condensation products unstable (i.e., the condensation product becomes turbid and sets up as a gel on standing) and corrosive to metals upon exposure to moisture. The instability and corrosive nature of such halogen contaminated organo-silicate condensation products is of great concern to the manufacturer and user particularly from the standpoint of handling, transporting and storing of same.

In accordance with this invention, it has been found that halogen contaminated organo-silicate condensation products wherein the undesirable halogen is present as hydrogen halide and/or as hydrolyzable halogen can be purified by a convenient and relatively inexpensive method and provide a non-corrosive product having unusually good storage properties. The purification procedure of this invention in its broader aspects comprises heating at a temperature in excess of about 50° C. the halogen contaminated organo-silicate condensation product with an alkali metal compound of the structure

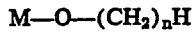

wherein M is an alkali metal (e. g., Na, K, Li, Rb and Cs) and wherein $n$ is an integer, e.g., from 0 to 5 inclusive, the amount of alkali metal compound being in excess of that theoretically required to form alkali metal halide upon reacting with the halogen containing contaminants.

While alkali metal alcoholates, e.g., sodium methylate, sodium ethylate, and the like, are operable in the process of this invention, it is preferred that the alkali metal compound be an alkali metal hydroxide and preferably sodium hydroxide. It is particularly preferred that the alkali metal hydroxide be employed in the form of an aqueous solution thereof. The amount of alkali metal compound employed will be that which provides an organo-silicate condensation product free of both hydrogen halide and hydrolyzable halogen which polymer upon mixing with alcohol or alcohol and water is alkaline to Methyl Orange (i.e., the sodium salt of p-dimethylaminoazobenzenesulfonic acid, a well known acid-base indicator), which amount in general will be in range of about 110% to about 150% of that theoretically required to react with the halogen containing contaminants and form alkali metal halide. The by-product alkali metal halide precipitates from the organic layer and is readily removed by any of the well-known methods for removing solids from liquids. It is preferred that the solids be removed by filtration employing any of the well-known pulverulent filter aids such as activated charcoal, kieselguhr, Attapulgus clay, diatomaceous earth, fuller's earth and the like. Of this group of filter aids, siliceous materials such as diatomaceous earth are particularly preferred.

In the preferred embodiment of this invention aqueous solutions of alkali metal hydroxide are used. Solutions over a wide range of concentrations of alkali metal hydroxide of this invention can be employed, however, in general they will be in the range of 10 to 50 parts by weight of alkali metal hydroxide per 100 parts by weight of solution. It is preferred that the concentration of alkali metal hydroxide be about 25 to 35 parts by weight per 100 parts by weight of the aqueous solution.

In the process of this invention, temperatures in excess of 50° C. will be employed and it is preferred that a temperature in the range of about 80° C. to about 150° C. be employed.

The process of this invention is applicable to any halogen contaminated organo-silicate condensation product, but is particularly applicable to the polymerized hydrolysis products of esters of orthosilicic acid of the structure

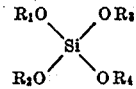

wherein $R_1$, $R_2$, $R_3$, and $R_4$ are like or unlike hydrocarbon radicals containing from 1 to 12 carbon atoms (e.g., methyl, ethyl, propyl, butyl, isoamyl, 2-ethylhexyl, decyl, dodecyl, cyclohexyl, benzyl, phenethyl, phenyl, tolyl, biphenyl, etc.) prepared from silicon tetrachloride and the appropriate mono-hydroxy substituted hydrocarbon containing from 1 to 12 carbon atoms.

As illustrative of the process of this invention, but not limitative thereof, is the following:

*Example I*

To a suitable reaction vessel equipped with a thermometer and agitator is charged 1000 grams of polyethylsilicate (prepared by refluxing tetraethyl orthosilicate obtained from ethyl alcohol and $SiCl_4$ with ethyl alcohol containing about 4.5% of water in such proportion as to provide 0.8 mol of water per mol of tetraethyl orthosilicate), which contains 0.005% by weight free hydrogen chloride and 0.002% by weight hydrolyzable chlorine substituents. The mass is heated to about 90° C. and thereto is added 0.37 gram of 25% aqueous sodium hydroxide and the mixture agitated for about 90 minutes. The resultant mass is cooled to about room temperature and thereto is added 2.5 grams of diatomaceous earth and the composite filtered. The filtrate so obtained is polyethylsilicate free of both hydrogen chloride and hydrolyzable chlorine substituents, alkaline to Methyl Orange, humidity stable and non-corrosive to ferrous metals after prolonged contact therewith.

*Example II*

To a suitable reaction vessel equipped with a thermometer and agitator is charged 1000 grams of polymethylsilicate (prepared by refluxing tetramethyl orthosilicate obtained from methyl alcohol and SiBr₄ with methyl alcohol containing about 5% water in such proportions as to provide 0.8 mol of water per mol of tetramethyl orthosilicate) which contains 0.006% by weight free hydrogen bromide and 0.003% hydrolyzable bromine substituents. The mass is heated to about 100° C. and thereto is added 0.29 gram of 25% aqueous potassium hydroxide and the mixture agitated for about 80 minutes. The resultant mass is cooled to room temperature and thereto is added a small amount of fuller's earth and the composite filtered. The filtrate so obtained is polymethylsilicate free of both hydrogen bromide and hydrolyzable bromine substituents, alkaline to Methyl Orange, humidity stable and non-corrosive to ferrous metals upon prolonged contact therewith.

*Example III*

To a suitable reaction vessel equipped with a thermometer and agitator is charged 1000 grams of polyethylsilicate which contains 0.008% by weight free hydrogen chloride and 0.004% by weight hydrolyzable chlorine substituents. The mass is heated to about 90° C. and thereto is added 0.69 gram of 25% aqueous sodium hydroxide and the mass agitated for about 75 minutes. The mass is cooled to room temperature and thereto is added a small amount of diatomaceous earth and the composite filtered. The filtrate so obtained is poly-ethyl silicate free of both hydrogen chloride and hydrolyzable chlorine substituents, alkaline to Methyl Orange, and humidity stable up to 95% relative humidity for 21 days at 25° C. The product so obtained is non-corrosive to metals as exemplified by mild steel, stainless steel and steel wool after prolonged contact therewith. The purified poly-ethylsilicate so obtained performed satisfactorily in precision casting work and in other poly-ethylsilicate applications.

In contrast to the foregoing the chlorine contaminated poly-ethylsilicate of Example III upon exposure to air at 25° C. and 85% relative humidity becomes turbid in 6 hours and gels in 3 days.

In further contrast the chlorine contaminated poly-ethylsilicate of Example III upon being agitated with 0.176 gram of 25% aqueous sodium hydroxide for 90 minutes at room temperature (about 20° C.) and filtered to remove sodium chloride provides a product which upon exposure to air at 25° C. and 85% relative humidity becomes turbid and gels in 3 days.

The purification process of this invention is particularly useful in improving the quality of chlorine contaminated organo-silicate condensation products obtained by reacting approximately one molecular proportion of silicon tetrachloride with approximately 2.5 to 3.0 molecular proportions of a mono-hydroxy substituted alkane containing not more than four carbon atoms in the presence of 5 to 15 parts by weight of water per 100 parts by weight of mono-hydroxy alkane. This process of preparing the polymerized product is preferably carried out at a temperature in the range of about 20° C. to about 50° C. After the reaction is completed, the mass is blown with air to reduce the residual hydrogen chloride content thereof and expel any unreacted alcohol and then filtered. The filtrate, i.e., poly-alkylsilicate which contains a small amount of both free hydrogen chloride and hydrolyzable chlorine substituents, is then subjected to the purification process of this invention, as for example by heating same to about 95° C. and admixing therewith 25 to 35% aqueous alkali metal hydroxide in an amount in the range of 110% to about 150% of that theoretically required to form alkali metal chloride upon reacting with the chlorine containing contaminants thereof. The product obtained upon filtering off the solids is free of both hydrogen chloride and hydrolyzable chlorine substituents, is alkaline to Methyl Orange, is humidity stable and non-corrosive to ferrous metals.

It is to be understood that in the foregoing description and appended claims the expression "halogen (or chlorine) contaminated organo-silicate condensation product" is meant to include any organo-silicate polymer having residual acidity as exemplified by free hydrogen halide (or chloride) and/or hydrolyzable halogen (or chlorine) substituted materials which on contact with water provide hydrogen halide (or chloride) regardless of the manner in which the halogen impurity in fact is present or chemically or physically bound in the condensation product.

While this invention has been described with respect to certain embodiments it is not so limited in that variations and modifications thereof obvious to one skilled in the art can be made without departing from the spirit or scope of this invention.

What is claimed is:

1. The method of purifying an organo-silicate compound said compound being a halogen-contaminated, condensation product of an organic ester of ortho-silicic acid and having the general structural formula

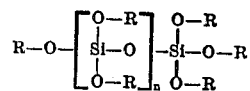

wherein "n" is a whole number, and wherein "R" is an organic radical selected from the group consisting of alkyl, cycloalkyl, aralkyl, aryl, alkaryl, and heterocyclic radicals, said radicals being like and dissimilar, said condensation product being further characterized in that it is contaminated with halogen contaminants in the form of free hydrogen halide and hydrolyzable halogen substituents which hydrolyze to form hydrogen halide, which comprises reacting the halogen contaminants of said condensation product with an aqueous alkali metal hydroxide at a temperature in excess of 50° C., said alkali metal hydroxide being in excess of that theoretically required to form an alkali metal halide upon reacting with the halogen-containing contaminants and being sufficient to provide a condensation product alkaline to Methyl Orange.

2. The method of purifying an organo-silicate compound, said compound being a chlorine-contaminated, condensation product of an organic ester of orthosilicic acid and having the general structural formula

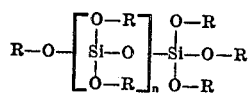

wherein "n" is a whole number, and wherein "R" is an organic radical selected from the gorup consisting of alkyl, cycloalkyl, aralkyl, aryl, alkaryl and heterocyclic radicals, said radicals being like and dissimilar, said condensation product being further characterized in that it is contaminated by chlorine contaminants in the form of free hydrogen chloride and hydrolyzable chlorine substituents which hydrolyze to form hydrogen chloride, which comprises heating said condensation product at a temperature in excess of 50° C. with an aqueous solution of an alkali metal hydroxide, containing 10 to 50 parts by weight of the latter per 100 parts by weight of the solution, the amount of alkali metal hydroxide being sufficient to provide a condensation product alkaline to Methyl Orange, and being in the range of about 110% to about 150% of that theoretically required to form an alkali metal chloride upon reacting with the said chlorine contaminants.

3. The process of claim 2 wherein the resultant reaction mass thereof is cooled to about room temperature, mixed with diatomaceous earth and the composite filtered.

4. The process of claim 2 wherein the aqueous alkali metal hydroxide solution contains 25 to 35 parts by weight alkali metal hydroxide per 100 parts by weight of solution.

5. The process of claim 4 wherein the alkali metal hydroxide is sodium hydroxide.

6. The process of claim 2 wherein the chlorine contaminated organo-silicate condensation product is the polymerized hydrolysis product of an ester of orthosilicic acid obtained by reacting $SiCl_4$ and a mono-hydroxy substituted hydrocarbon containing 1 to 12 carbon atoms.

7. The process of claim 2 wherein the chlorine contaminated organo-silicate condensation product is the polymerized hydrolysis product of tetraethyl orthosilicate obtained by reacting $SiCl_4$ with ethyl alcohol.

8. The process of claim 2 wherein the chlorine contaminated organo-silicate condensation product is the reaction product of approximately one molecular proportion of $SiCl_4$ with 2.5 to 3.0 molecular proportions of a monohydroxy alkane containing not more than four carbon atoms in the presence of 5 to 15 parts by weight of water per 100 parts by weight of mono-hydroxy alkane.

9. The method of purifying a chlorine contaminated organo-silicate condensation product which comprises heating at a temperature in the range of about 80° C. to about 150° C. said condensation product with an aqueous solution of sodium hydroxide containing 25 to 35 parts by weight of the latter per 100 parts by weight of solution, the amount of sodium hydroxide being in the range of about 110% to about 150% of that theoretically required to form alkali metal chloride upon reacting with the chlorine containing contaminants, the said chlorine contaminated organo-silicate condensation product being the reaction product of approximately one molecular proportion of $SiCl_4$ with 2.5 to 3.0 molecular proportions of a mono-hydroxy alkane containing not more than four carbon atoms in the presence of 5 to 15 parts by weight of water per 100 parts by weight of the mono-hydroxy alkane.

10. The method of purifying a chlorine-contaminated organo-silicate condensation product which comprises heating at a temperature of about 80° C. to 150° C. the polymerized hydrolysis product of tetraethyl orthosilicate obtained by reacting $SiCl_4$ with ethyl alcohol and which product also contains chlorine contaminants in the form of free hydrogen chloride and hydrolyzable chlorine substituents which hydrolyze to form hydrogen chloride, and adding to said product an aqueous solution of sodium hydroxide containing 25–35 parts by weight of NaOH per 100 parts by weight of the solution, the amount of said solution added being sufficient to provide an amount of NaOH in the range of about 110% to about 150% of that theoretically required to react with said chlorine contaminants to form sodium chloride, maintaining the resulting mass between about 80° C. and about 150° C. until said NaOH has reacted with substantially all of said chlorine contaminants, and thereafter cooling said mass and filtering the mass to remove sodium chloride therefrom.

References Cited in the file of this patent

UNITED STATES PATENTS

| 2,114,866 | Vaughn | Apr. 19, 1938 |
| 2,600,307 | Lucas et al. | June 10, 1952 |
| 2,799,693 | Dodgson | July 16, 1957 |
| 2,814,634 | Da Fano | Nov. 26, 1957 |
| 2,846,459 | Morgan et al. | Aug. 5, 1958 |

FOREIGN PATENTS

| 162,927 | Austria | Apr. 25, 1949 |
| 621,742 | Great Britain | Apr. 19, 1949 |

OTHER REFERENCES

Malatesta: "Gazza chim. ital.," vol. 78 (1948), pages 747–53, page 752 only needed (43 Chem. Abstr. 5737–8).